(12) United States Patent
Singh et al.

(10) Patent No.: US 8,312,738 B2
(45) Date of Patent: Nov. 20, 2012

(54) INTEGRATED CONTROLLED FREEZE ZONE (CFZ) TOWER AND DIVIDING WALL (DWC) FOR ENHANCED HYDROCARBON RECOVERY

(75) Inventors: Vikram Singh, Naperville, IL (US);
Edward J. Grave, Spring, TX (US);
Paul Scott Northrop, Spring, TX (US);
Narasimhan Sundaram, Fairfax, VA (US)

(73) Assignee: ExxonMobil Upstream Research Company, Houston, TX (US)

( * ) Notice: Subject to any disclaimer, the term of this patent is extended or adjusted under 35 U.S.C. 154(b) by 201 days.

(21) Appl. No.: 12/518,866

(22) PCT Filed: Nov. 20, 2007

(86) PCT No.: PCT/US2007/024217
§ 371 (c)(1),
(2), (4) Date: Jun. 11, 2009

(87) PCT Pub. No.: WO2008/091317
PCT Pub. Date: Jul. 31, 2008

(65) Prior Publication Data
US 2009/0266107 A1    Oct. 29, 2009

Related U.S. Application Data

(60) Provisional application No. 60/881,391, filed on Jan. 19, 2007.

(51) Int. Cl.
*F25J 3/00* (2006.01)
(52) U.S. Cl. .................. 62/629; 62/620; 62/637
(58) Field of Classification Search ............ 62/617, 62/618, 620, 625, 629, 632, 637
See application file for complete search history.

(56) References Cited

U.S. PATENT DOCUMENTS 2,621,216 A    12/1952   White
2,863,527 A    12/1958   Herbert et al. ............. 183/115
(Continued)

FOREIGN PATENT DOCUMENTS

EP           508244       10/1992
(Continued)

OTHER PUBLICATIONS

Amin, R., "Advanced Mini Natural Gas Liquefier," LNG Journal, Mar./Apr. 2003, pp. 20-23.
Denton, R.D. et al., "Integrated Low Temperature Processing of Sour Natural Gas", Proceedings of the Sixty-Fourth Annual Convention, Gas Processors Association, pp. 92-96.
Haut, R.C. et al., "Development and Application of the Controlled Freeze Zone Process", OSEA 88197, 7th Offshore South East Asia Conference, Feb. 2-5, 1988, pp. 840-847, Singapore.

(Continued)

*Primary Examiner* — Mohammad Ali
*Assistant Examiner* — Keith Raymond
(74) *Attorney, Agent, or Firm* — ExxonMobil Upstream Research Law Dept.

(57) ABSTRACT

The present invention relates to methods and apparatuses for the operation of a distillation tower containing a controlled freezing zone and at least one distillation section. The process and tower design are utilized for the additional recovery of hydrocarbons from an acid gas. In this process, a separation process is utilized in which a multi-component feedstream is introduced into an apparatus that operates under solids forming conditions for at least one of the feedstream components. The freezable component, although typically $CO_2$, $H_2S$, or another acid gas, can be any component that has the potential for forming solids in the separation system. A dividing wall is added to at least a portion of the lower distillation section of the apparatus to effect the separation of at least some fraction of the hydrocarbons in that portion of the tower.

24 Claims, 4 Drawing Sheets

U.S. PATENT DOCUMENTS

| | | | | |
|---|---|---|---|---|
| 3,050,950 | A | 8/1962 | Karwat et al. | 62/13 |
| 3,109,726 | A | 11/1963 | Karwat | 62/13 |
| 3,393,527 | A | 7/1968 | Swensen et al. | 62/16 |
| 3,400,512 | A | 9/1968 | McKay | 55/69 |
| 3,767,766 | A | 10/1973 | Tjoa et al. | |
| 3,933,001 | A | 1/1976 | Muska | 62/47 |
| 4,246,015 | A | 1/1981 | Styring | 62/12 |
| 4,405,585 | A | 9/1983 | Sartori et al. | 423/228 |
| 4,417,449 | A | 11/1983 | Hegarty et al. | 62/28 |
| 4,421,535 | A | 12/1983 | Mehra | 62/17 |
| 4,459,142 | A | 7/1984 | Goddin | 62/17 |
| 4,511,382 | A | 4/1985 | Valencia et al. | |
| 4,512,782 | A | 4/1985 | Bauer et al. | 55/48 |
| 4,533,372 | A * | 8/1985 | Valencia et al. | 62/629 |
| 4,551,158 | A | 11/1985 | Wagner et al. | 55/46 |
| 4,563,202 | A | 1/1986 | Yao et al. | 62/17 |
| 4,602,477 | A | 7/1986 | Lucadamo | 62/24 |
| 4,609,388 | A | 9/1986 | Adler et al. | 62/12 |
| 4,695,672 | A | 9/1987 | Bunting | 585/867 |
| 4,720,294 | A | 1/1988 | Lucadamo et al. | 62/31 |
| 4,762,543 | A | 8/1988 | Pantermuehl et al. | 62/28 |
| 4,831,206 | A | 5/1989 | Zarchy | 585/737 |
| 4,923,493 | A | 5/1990 | Valencia et al. | |
| 4,935,043 | A | 6/1990 | Blanc et al. | 62/20 |
| 4,976,849 | A | 12/1990 | Soldati | 208/351 |
| 5,062,270 | A * | 11/1991 | Haut et al. | 62/629 |
| 5,120,338 | A * | 6/1992 | Potts et al. | 62/629 |
| 5,233,837 | A | 8/1993 | Callahan | |
| 5,265,428 | A * | 11/1993 | Valencia et al. | 202/158 |
| 5,335,504 | A * | 8/1994 | Durr et al. | 62/632 |
| 5,620,144 | A | 4/1997 | Strock et al. | |
| 5,700,311 | A | 12/1997 | Spencer | 95/236 |
| 5,720,929 | A | 2/1998 | Minkkinen et al. | 422/190 |
| 5,819,555 | A | 10/1998 | Engdahl | 62/637 |
| 5,956,971 | A | 9/1999 | Cole et al. | |
| 5,964,985 | A | 10/1999 | Wootten | |
| 5,983,663 | A | 11/1999 | Sterner | 62/620 |
| 6,053,007 | A | 4/2000 | Victory et al. | |
| 6,082,133 | A | 7/2000 | Barclay et al. | 62/619 |
| 6,082,373 | A | 7/2000 | Sakurai et al. | |
| 6,162,262 | A | 12/2000 | Minkkinen et al. | 23/295 |
| 6,223,557 | B1 | 5/2001 | Cole | 62/613 |
| 6,240,744 | B1 * | 6/2001 | Agrawal et al. | 62/643 |
| 6,336,334 | B1 | 1/2002 | Minkkinen et al. | 62/123 |
| 6,374,634 | B2 | 4/2002 | Gallarda et al. | 62/620 |
| 6,401,486 | B1 | 6/2002 | Lee et al. | 62/630 |
| 6,416,729 | B1 | 7/2002 | DeBerry et al. | 423/573.1 |
| 6,442,969 | B1 | 9/2002 | Rojey et al. | 62/618 |
| 6,505,683 | B2 | 1/2003 | Minkkinen et al. | 166/266 |
| 6,539,747 | B2 | 4/2003 | Minta et al. | 62/620 |
| 6,565,629 | B1 | 5/2003 | Hayashida et al. | |
| 6,735,979 | B2 | 5/2004 | Lecomte et al. | 62/611 |
| 6,818,194 | B2 | 11/2004 | DeBerry et al. | 423/228 |
| 6,946,017 | B2 | 9/2005 | Leppin et al. | 95/139 |
| 6,958,111 | B2 | 10/2005 | Rust et al. | 202/158 |
| 6,962,061 | B2 | 11/2005 | Wilding et al. | 62/613 |
| 7,001,490 | B2 * | 2/2006 | Wostbrock et al. | 203/1 |
| 7,004,985 | B2 | 2/2006 | Wallace et al. | 48/198.3 |
| 7,073,348 | B2 | 7/2006 | Clodic et al. | 62/532 |
| 7,121,115 | B2 | 10/2006 | Lemaire et al. | 62/625 |
| 7,152,431 | B2 | 12/2006 | Amin et al. | 62/637 |
| 7,219,512 | B1 | 5/2007 | Wilding et al. | 62/617 |
| 7,325,415 | B2 | 2/2008 | Amin et al. | 62/541 |
| 7,424,808 | B2 | 9/2008 | Mak | 62/625 |
| 7,442,233 | B2 | 10/2008 | Mitariten | 95/123 |
| 7,493,779 | B2 | 2/2009 | Amin | 62/617 |
| 7,722,289 | B2 | 5/2010 | Leone et al. | 405/53 |
| 2001/0010286 | A1 * | 8/2001 | Wostbrock et al. | 203/1 |
| 2001/0052453 | A1 * | 12/2001 | Rust et al. | 202/158 |
| 2002/0006371 | A1 | 1/2002 | Watson et al. | |
| 2002/0174687 | A1 | 11/2002 | Cai | 65/158 |
| 2003/0041518 | A1 * | 3/2003 | Wallace et al. | 48/197 R |
| 2003/0139631 | A1 | 7/2003 | Muller et al. | |
| 2003/0181772 | A1 | 9/2003 | Meyer et al. | |
| 2003/0192343 | A1 | 10/2003 | Wilding et al. | 62/613 |
| 2004/0187686 | A1 * | 9/2004 | Amin et al. | 95/228 |
| 2005/0072186 | A1 * | 4/2005 | Amin et al. | 62/601 |
| 2005/0211541 | A1 | 9/2005 | Bassler et al. | |
| 2006/0137967 | A1 | 6/2006 | Kister et al. | |
| 2006/0144079 | A1 | 7/2006 | Amin | 62/532 |
| 2006/0179878 | A1 | 8/2006 | Nohlen | 62/617 |
| 2006/0239879 | A1 | 10/2006 | Lallemand et al. | 423/210 |
| 2007/0056317 | A1 | 3/2007 | Amin et al. | 62/532 |
| 2007/0144943 | A1 | 6/2007 | Lemaire et al. | 208/208 |
| 2007/0277674 | A1 | 12/2007 | Hirano et al. | 95/290 |
| 2008/0034789 | A1 * | 2/2008 | Fieler et al. | 62/623 |
| 2008/0282884 | A1 | 11/2008 | Kelley et al. | 95/96 |
| 2008/0307827 | A1 | 12/2008 | Hino et al. | 62/634 |
| 2009/0023605 | A1 | 1/2009 | Lebl et al. | 506/27 |
| 2009/0071648 | A1 | 3/2009 | Hagen et al. | 166/272.1 |
| 2009/0220406 | A1 | 9/2009 | Rahman | 423/437.1 |
| 2009/0261017 | A1 | 10/2009 | Iqbal et al. | 208/128 |
| 2010/0024472 | A1 | 2/2010 | Amin et al. | 62/541 |
| 2010/0107687 | A1 | 5/2010 | Andrian et al. | 62/620 |

FOREIGN PATENT DOCUMENTS

| | | |
|---|---|---|
| EP | 1 323 698 A2 | 7/2003 |
| GB | 2 221 977 A | 2/1990 |
| WO | WO 01/85656 A1 | 11/2001 |
| WO | WO02/39038 | 5/2002 |
| WO | WO 03/062725 A1 | 7/2003 |
| WO | WO 2004/009204 A1 | 1/2004 |
| WO | WO2004/020118 | 3/2004 |
| WO | WO2004/047956 | 6/2004 |
| WO | WO 2004/070297 A1 | 8/2004 |
| WO | WO2006/022885 | 3/2006 |
| WO | WO2007/030888 | 3/2007 |
| WO | WO 2008/091316 A1 | 7/2008 |
| WO | WO2008/091317 | 7/2008 |
| WO | WO2008/095258 | 8/2008 |
| WO | WO2008/152030 | 12/2008 |
| WO | WO2009/087206 | 7/2009 |
| WO | WO2010/003894 | 1/2010 |
| WO | WO2010/006934 | 1/2010 |
| WO | WO2010/023238 | 3/2010 |
| WO | WO2010/034627 | 4/2010 |
| WO | WO2010/052299 | 5/2010 |
| WO | WO2010/079175 | 7/2010 |
| WO | WO2010/079177 | 7/2010 |

OTHER PUBLICATIONS

Haut, R.C. et al., "Development and Application of the Controlled-Freeze-Zone Process", *SPE Production Engineering*, Aug. 1989, pp. 265-271.

Thomas, E.R. et al., "Conceptual Studies Using the Controlled Freeze Zone (CFZ) Process", Paper No. 6d, 1987 AlchE Summer National Meeting, Aug. 16-19, 1987, pp. 1-7-Figs. 1-5.

European Search Report No. 114975, Jun. 29, 2007, 3 pages.

Haut, R. C. et al. (1988) "Development and Application of the Controlled Freeze Zone Process," *SPE 17757, SPE Gas Tech. Symp.*—Dallas, TX, pp. 435-443.

Mitariten, M. et al. (2007) "The Sorbead™ Quick-Cycle Process for Simultaneous Removal of Water, Heavy Hydrocarbons and Mercaptans from Natural Gas," *Laurance Reid Gas Conditioning Conference*, Feb. 25-27, 2007, 14 pages.

Pagcatipunan, C. et al. (2005) "Maximize the Performance of Spray Nozzle Systems," *CEP Magazine*, Dec. 2005, pp. 38-44.

Reyes, S. C. et al. (1997) "Frequency Modulation Methods for Diffusion and Adsorption Measurements in Porous Solids," *J. Phys. Chem. B*, v.101, pp. 614-622.

Victory, D. J. et al. (1987) "The CFZ Process: Direct Methane-Carbon Dioxide Fractionation," *66th Ann. GPA Convention*, Mar. 16-18, Denver, CO, 4 pages.

Aaron, D. et al. (2005) "Separation of $CO_2$ from Flue Gas: A Review," *Separation Science and Technology*, 40, pp. 321-348.

Hassan, S. M. N. (2005) "Techno-Economic Study of $CO_2$ Capture Process for Cement Plants," *University of Waterloo—Thesis*, 200 pages.

Northrop, P. Scott et al. (2004) "Cryogenic Sour Gas Process Attractive for Acid Gas Injection Applications," *83rd Ann. Gas Processors Assoc. Convention*, New Orleans, LA, 8 pages.

Thomas, E. R. et al. (1988) "Conceptual Studies for $CO_2$/Natural Gas Separation Using the Control Freeze Zone (CFZ) Process," *Gas Separation and Purification*, v. 2, pp. 84-89.

* cited by examiner

INTEGRATED CONTROLLED FREEZE ZONE (CFZ) TOWER AND DIVIDING WALL (DWC) FOR ENHANCED HYDROCARBON RECOVERY

CROSS REFERENCE TO RELATED APPLICATIONS

This application is the National Stage of International Application No. PCT/US2007/024217, filed 20 Nov. 2007, which claims the benefit of U.S. Provisional Application No. 60/881,391 filed 19 Jan. 2007.

This application is related to U.S. Provisional No. 60/881,395, entitled Controlled Freeze Zone Tower, filed 19 Jan. 2007, by Eleanor R. Fieler, Edward J. Grave, Paul Scott Northrop, and Norman K. Yeh.

BACKGROUND OF THE INVENTION

1. Field of the Invention

Embodiments of the invention generally relate to a method and apparatus for effectively separating hydrocarbons from an acid gas stream by treating the gas in at least one distillation zone containing a dividing wall and a controlled freezing zone.

2. Description of the Related Art

Sour natural gas is treated to remove carbon dioxide ($CO_2$), hydrogen sulfide ($H_2S$), and other contaminants before it can be further processed to recover natural gas liquids, used as an environmentally-acceptable fuel, or used as feedstock for a chemical or gas to liquids facility. For "highly sour" feeds (e.g., >20% $CO_2$+$H_2S$), it can be particularly challenging to design, construct, and operate an economically viable process for separating these contaminants from the desired hydrocarbons. In many cases, the concentrated acid gas (consisting primarily of $H_2S$ and $CO_2$) is sent to a sulfur recovery unit (SRU) to convert the toxic $H_2S$ into benign elemental sulfur, while the $CO_2$ is vented.

Sulfur recovery is a relatively expensive and complex process. In some areas (e.g., the Caspian Sea region), additional elemental sulfur production is particularly undesirable because there is no market for it. Consequently, millions of tons of sulfur are stored in large, above-ground blocks in some areas of the world. Venting of $CO_2$ is also coming under greater scrutiny, as some countries have ratified the Kyoto protocol requiring reduction of $CO_2$ emissions. Thus, acid gas injection (AGI) is often a preferred alternative to sulfur recovery.

Cryogenic gas processing (i.e., distillation) avoids the use of solvents, minimizes acid gas removal equipment, and generates a liquefied concentrated acid gas stream at moderate pressure (e.g., 350-500 pounds per square inch gauge (psig)) that is suitable for injection into a subterranean reservoir. Because the liquefied acid gas has a relatively high density, hydrostatic head can be used to great advantage in an injection well. The energy required to pump the liquefied acid gas is much lower than that required to compress low-pressure acid gases to reservoir pressure. Cryogenic processing also requires fewer stages of compressors and pumps.

If $CO_2$ is present at concentrations greater than about 5% in the gas to be processed, the $CO_2$ freezes out as a solid in a standard cryogenic distillation unit. This renders normal cryogenic distillation processes inoperable. The Controlled Freeze Zone (CFZ) process circumvents this problem by deliberately freezing the $CO_2$ out in a specially-designed distillation tower. The CFZ process and a variety of improvements are described in U.S. Pat. Nos. 4,533,372; 4,923,493; 5,062,720, 5,120,338, 5,265,428, and 6,053.007. The CFZ process generates a clean methane stream (along with any nitrogen or helium present in the raw gas) overhead, while a liquid acid gas stream at 30-40° F. is generated at the bottom of the tower. The CFZ process is thus synergetic with AGI.

However, any hydrocarbons heavier than methane are lost with the acid gas. Therefore, there is a need for a method and apparatus for separating and recovering additional hydrocarbons from a liquid acid gas stream.

SUMMARY OF THE INVENTION

Embodiments of the invention generally relate to a method and apparatus for effectively separating hydrocarbons from an acid gas stream by treating the gas in at least one distillation zone and a controlled freezing zone.

One embodiment provides a method for the separation of a feedstream in a distillation tower with a controlled freezing zone. The method generally includes feeding a mixture of at least one acid gas and methane to a lower distillation zone within a column. An enriched carbon dioxide liquid bottoms stream and a freezing zone vapor feedstream are produced in the lower distillation zone. The freezing zone vapor feedstream is contacted with at least one freezing zone liquid feedstream containing methane in the controlled freezing zone at a temperature and pressure wherein both solids containing carbon dioxide and a methane-enriched vapor stream are formed. An acid gas component is stripped from the methane enriched vapor stream. The acid gas component is separated into a liquid acid gas stream and a hydrocarbon stream.

In another embodiment a method for the recovery of hydrocarbons from a feedstream containing methane and carbon dioxide gas in a distillation tower is provided. The method generally includes maintaining a lower distillation zone configured to produce an enriched carbon dioxide liquid bottoms stream and a freezing zone vapor feedstream. A controlled freezing zone configured to contact the freezing zone vapor feedstream with at least one freezing zone liquid feedstream containing methane at a temperature and pressure whereby both solids-containing carbon dioxide and a methane-enriched vapor stream are formed in the freezing zone is maintained. The feedstream is introduced into the lower distillation zone to produce the enriched carbon dioxide and the freezing zone vapor feedstream. The freezing zone vapor feedstream is introduced into the freezing zone and contacted with the at least one freezing zone liquid feedstream. Solids containing carbon dioxide and the methane-enriched vapor stream are formed in the controlled freezing zone. The solids containing carbon dioxide are melted and a liquid stream containing the melted solids is introduced into the lower distillation zone. The liquid stream containing the melted solids is separated into a liquefied acid gas stream and a hydrocarbon stream. A portion of the hydrocarbon stream is recovered as an enriched hydrocarbon product stream.

In another embodiment a distillation tower for the separation of a feedstream containing methane and carbon dioxide acid gas is provided. The distillation tower generally includes a lower distillation zone comprising a dividing wall wherein an enriched carbon dioxide liquid bottoms stream and a freezing zone vapor feedstream are produced at a temperature and pressure at which substantially no carbon dioxide solids are formed, an inlet to the lower zone of the distillation tower configured for a feedstream containing methane and carbon dioxide acid gas, and a controlled freezing zone wherein a freezing zone liquid feedstream containing methane is contacted with the freezing zone vapor feedstream at a temperature and pressure wherein both solids containing carbon dioxide and a methane-enriched vapor stream are formed.

In some of the embodiments above, various other aspects may be modified to enhance the operations. For example, no carbon dioxide solids are formed in the lower distillation zone with the temperatures being in the range from about $-104.4°$ F. to about $45.9°$ F. and the pressures in the range of about 366.4 psia to about 371.7 psia. Further, both solids containing carbon dioxide and a methane-enriched vapor stream are formed in the control freeze zone with the temperatures being in the range from about $-150.9°$ F. to about $-129.8°$ F. and the pressures in the range of about 363.7 psia to about 365.7 psia. In addition, in other embodiments, the method may include maintaining a second distillation zone configured to produce at least one freezing zone liquid feedstream and an overhead vapor stream and operated at a temperature and a pressure at which substantially no carbon dioxide solids are produced within the second distillation zone; condensing at least a portion of the overhead vapor stream and recycling at least a portion of the condensed overhead vapor stream as reflux in the second distillation zone; and recovering at least a portion of the remainder of the overhead vapor stream as a methane-enriched product stream.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures. It is contemplated that elements and/or process steps of one embodiment may be beneficially incorporated in other embodiments without additional recitation.

DETAILED DESCRIPTION

Introduction and Definitions

Embodiments of the present invention provide improvements to the operation of a distillation tower containing a controlled freezing zone, particularly the process and tower design utilized for the additional recovery of hydrocarbons from an acid gas. This invention relates generally to a separation process in which a multi-component feedstream is introduced into an apparatus that operates under solids forming conditions for at least one of the feedstream components. The freezable component, although typically $CO_2$, $H_2S$, or another acid gas, can be any component that has the potential for forming solids in the separation system. A dividing wall is added to at least a portion of the lower distillation section of the apparatus to effect the separation of at least some fraction of the hydrocarbons in that portion of the tower.

As used herein, the term "sour gas" generally refers to natural gas containing sour species such as hydrogen sulfide ($H_2S$) and carbon dioxide ($CO_2$). When the $H_2S$ and $CO_2$ have been removed from the natural gas feedstream, the gas is classified as "sweet." The term "sour gas" is applied to natural gases including $H_2S$ because of the odor that is emitted even at low concentrations from an unsweetened gas. $H_2S$ is a contaminant of natural gas that is removed to satisfy legal requirements, as $H_2S$ and its combustion products of sulfur dioxide and sulfur trioxide are also toxic. Furthermore $H_2S$ is corrosive to most metals normally associated with gas pipelines so that processing and handling of sour gas may lead to premature failure of such systems.

As used herein, the term "CFZ" (an acronym for "Controlled-Freeze-Zone" process) generally refers to a process where acid gas components are separated by cryogenic distillation through the controlled freezing and melting of carbon dioxide in a single column, without use of freeze-suppression additives. The CFZ process uses a cryogenic distillation column with a special internal section (CFZ section) to handle the solidification and melting of $CO_2$. This CFZ section does not contain packing or trays like conventional distillation columns, instead it contains one or more spray nozzles and a melting tray. Solid carbon dioxide forms in the vapor space in the distillation column and falls into the liquid on the melting tray. Substantially all of the solids that form are confined to the CFZ section. The portions of the distillation tower above and below the CFZ section of the tower are similar to conventional cryogenic demethanizer columns. A more detailed description of the CFZ process is disclosed in U.S. Pat. Nos. 4,533,372; 4,923,493; 5,120,338; and 5,265,428, which are herein incorporated by reference.

As used herein, the term "dividing wall column" generally refers to a distillation column with a dividing wall located in the middle region. A dividing wall column is in principle a simplification of a system of thermally coupled distillation columns. The dividing wall extends to above and to below a feedstream inlet. On the other side, located opposite the feedstream inlet, at least one sidestream outlet is located at the same height as, above or below the feedstream inlet. The dividing wall is located between the sidestream outlet and the feedstream inlet. The dividing wall is generally or substantially vertical. In the region of the column which is divided by the dividing wall, lateral mixing of liquid and vapor streams is not possible. As a result, the total number of distillation columns required for fractionating multicomponent mixtures is reduced. A dividing wall column generally has the following segments: an upper column region located above the dividing wall, an inflow section located on the side of the feed point and bounded laterally by a dividing wall, an offtake section located on the side of the side offtake and bounded laterally by the dividing wall and a lower column region located below the dividing wall. The use of a dividing wall column is advantageous in terms of energy consumption and capital costs.

As used herein, the term "pressure swing adsorption" (PSA) generally refers to a technique performed with an adsorption system to separate and purify gases. Similar processing can include techniques performed using other adsorption systems, for e.g., TSA (thermal swing adsorption). These techniques may be applied to liquid mixtures. PSA includes multiple steps performed as a cycle, beginning with a feed step where mixtures of feed gases at high pressure are passed over adsorbent materials which selectively remove components of the mixture, thereby producing a product gas enriched in a preferred component. Cycles can be of any length, e.g. from seconds to minutes or longer.

EXEMPLARY EMBODIMENTS

Figure 1:
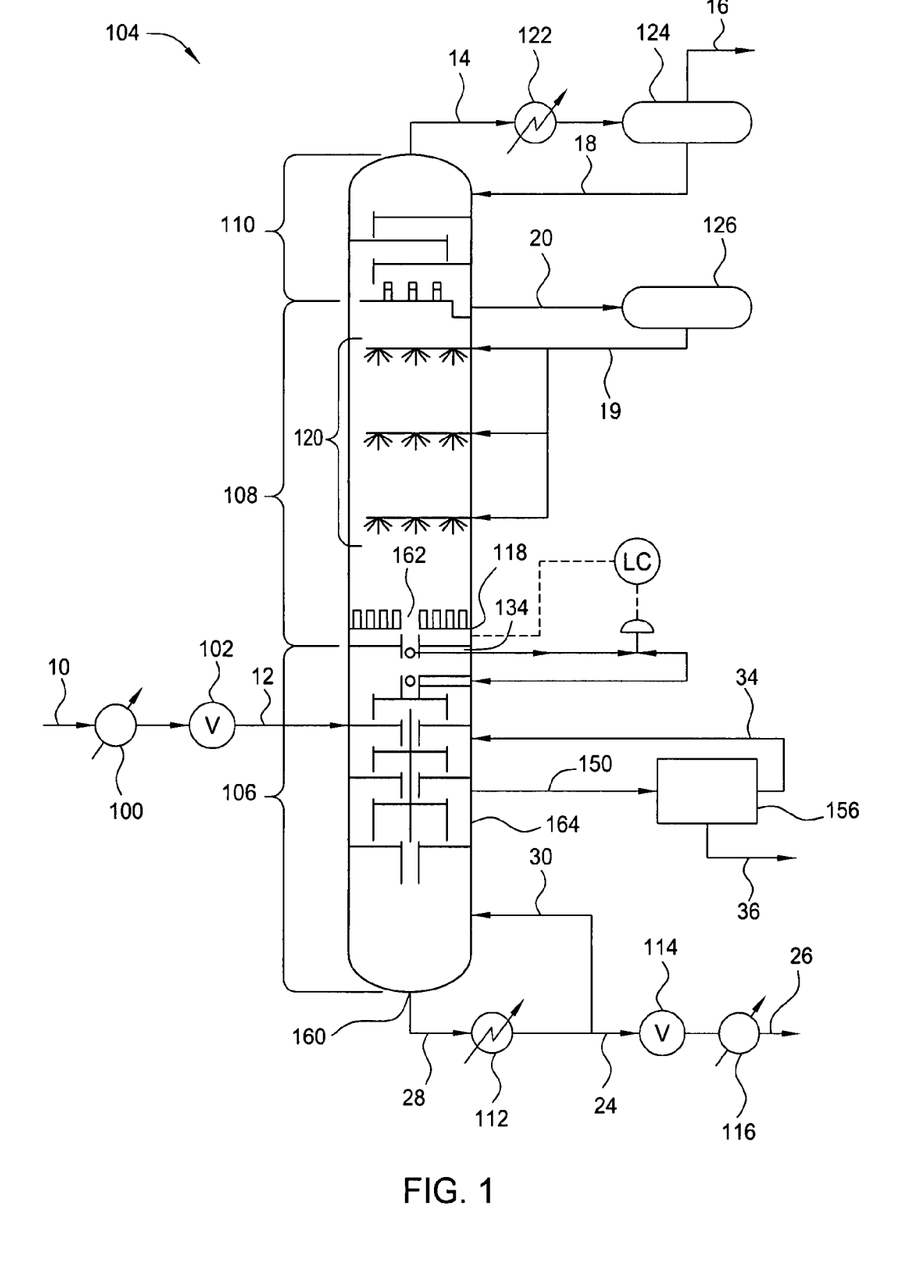
FIG. 1 is a schematic diagram of one embodiment of a distillation tower of the present invention.

FIG. 1 is a schematic diagram of one embodiment of a distillation column of the present invention. In this example, a tower feed or sour gas feedstream 10, which may be a mixture of at least one acid gas and methane, may include 61% methane, 15% $H_2S$, 9% $CO_2$, nitrogen ($N_2$), and additional hydrocarbons such as $C_2^+$ and $C_3^+$ is introduced into a distillation tower 104 through line 12 at an initial condition of 900 pounds per square inch absolute (psia). This sour gas feedstream may be first cooled in indirect heat exchanger 100 and expanded through Joule-Thompson ("J-T") valve 102. The function of heat exchanger 100 and J-T valve 102 is to drop the temperature to a level suitable for introduction of this stream into the methane-carbon dioxide distillation tower 104. For the purposes of this illustration, the distillation tower 104 is operated at a pressure of about 361.7 psia, and the tower feed entering through line 12 is at a temperature of about −74.1° F. One skilled in the art would readily perceive that similar illustrations could be made for feedstreams at other suitable combinations of temperature, pressure, and composition.

Distillation tower 104 is desirably separated into three distinct sections. The lower distillation section or zone 106 or "stripping section," the controlled freezing zone 108 or middle distillation zone or section, and an upper distillation zone or section 110 or "rectification section." The tower feed, as mentioned above, is introduced into the lower distillation section 106 through line 12 where it undergoes typical distillation. The internals of lower section 106 will be discussed in detail with reference to FIG. 2 and may include suitable trays, downcomers, and weirs, as are suitable for separating a carbon dioxide-methane mixture.

Liquid carbon dioxide product, such as an enriched acid gas liquid bottoms stream that may include $H_2S$, $C_2^+$, and $CO_2$ or a liquefied acid gas stream, leaves the bottom of the lower distillation section 106 through line 28. In some embodiments, the liquid carbon dioxide product is heated in a reboiler 112, and a portion is returned to the distillation tower 104 as reboiled liquid through line 30. The remainder leaves the process as a product via line 24. This stream is quite versatile in that it may be flashed in J-T valve 114 and its refrigeration value utilized elsewhere in the unit in the manner illustrated by heat exchanger 116.

In the lower distillation section 106, the lighter vapors leave this distillation section via a melt tray 118 as a freezing zone vapor feedstream comprising $CO_2$, $CH_4$, and $N_2$. Once in the controlled freezing zone 108, the freezing zone vapor feedstream contacts the liquid spray or freezing zone liquid feedstream, generally comprising methane, emanating from nozzles or spray jet assemblies 120. The freezing zone liquid feedstream contacts the freezing zone vapor feedstream at a temperature and pressure wherein solids containing carbon dioxide and a methane enriched vapor stream comprising $CH_4$ and $N_2$ are formed. The methane enriched vapor stream then continues up through the upper distillation section 110 where it contacts reflux, generally comprising $CH_4$, introduced to the tower through line 18. The methane enriched vapor stream or overhead vapor stream leaves distillation tower 104 through line 14, is partially condensed in reflux condenser 122 and is separated into liquid and vapor phases in reflux drum 124. Liquid methane from reflux drum 124 is returned to the tower via line 18. The vapor from the drum is taken off as a product in line 16 for subsequent sale to a pipeline or condensation as LNG.

The liquid produced in upper distillation section 110 is collected and withdrawn from the tower via line 20. Liquid in line 20 may be accumulated in vessel 126 and returned to the controlled freezing zone using spray nozzles 120 via line 19. The vapor rising through the melt tray 118 meets the spray emanating from nozzles 120. Solid carbon dioxide forms as precipitate and falls to the bottom of controlled freezing zone 108. A level of liquid (possibly containing some melting solids) is maintained in the bottom of controlled freezing zone 108.

The temperature of the melt tray may be controlled by heater 134. The typical temperature may range up to about −40° F. In one embodiment, the heater 134 may use the heat available in product line 26. In another embodiment, the heater 134 may be electric or use any other suitable and available heat source. In one embodiment, the heater 134 may be external to the distillation tower 104. It is contemplated that under most conditions, operation of heater 134 may not be required. In any event, liquid flows down from the bottom of controlled freezing zone 108 into the upper end of lower distillation section 106. The heater 134 ensures that no solids leave the controlled freezing zone 108 to plug the distillation trays found in the lower distillation section 106.

The melt tray 118 collects and warms the solid-liquid mixture from the controlled freezing zone 108. (Once the composition is greater than approximately 70% $CO_2$, it reverts to a vapor-liquid system.) The melt tray 118 is designed to provide adequate heat transfer to melt solid $CO_2$ and to facilitate liquid/slurry drawoff to the lower distillation section 106 of the distillation tower 104.

It is contemplated that in certain circumstances, the upper distillation zone may not be needed, or at least, not desired. In such an instance, a portion of the vapor leaving the controlled freezing zone 108 is condensed in overhead condenser 122 and returned as liquid feed to the spray nozzles 120. In this embodiment, it should be clear that lines 18 and 19 are one and the same, line 20 is eliminated, and vessels 124 and 126 are one and the same. The freezing zone liquid feedstream in line 19 could then be sub-cooled by means of an indirect cooling means, such as a heat exchanger, which could be located on line 19.

In this schematic diagram of one embodiment of a distillation column, the lower distillation zone 106 comprises a dividing wall column configured to separate the feedstream containing methane and carbon dioxide into a low boiler fraction, an intermediate boiler fraction, and a high boiler fraction. The intermediate boiler fraction comprises a hydrocarbon stream, the high boiler fraction comprises a liquefied acid gas stream and the low boiler fraction comprises methane. In this embodiment, the low boiler at the tower overhead may have a temperature of about −153.5° F. and a pressure of about 361.7 psia, the intermediate boiler at sidedraw may have a temperature of about −73.0° F. and a pressure of about 371.0 psia, and the high boiler at the tower bottoms may have a temperature of about 45.9° F. and a pressure of about 371.7 psia. In this process, recovering a portion of the hydrocarbon stream as a hydrocarbon-enriched product stream may include concentrating the hydrocarbon stream to produce the hydrocarbon-enriched product stream and an enriched sour gas stream.

Figure 2:
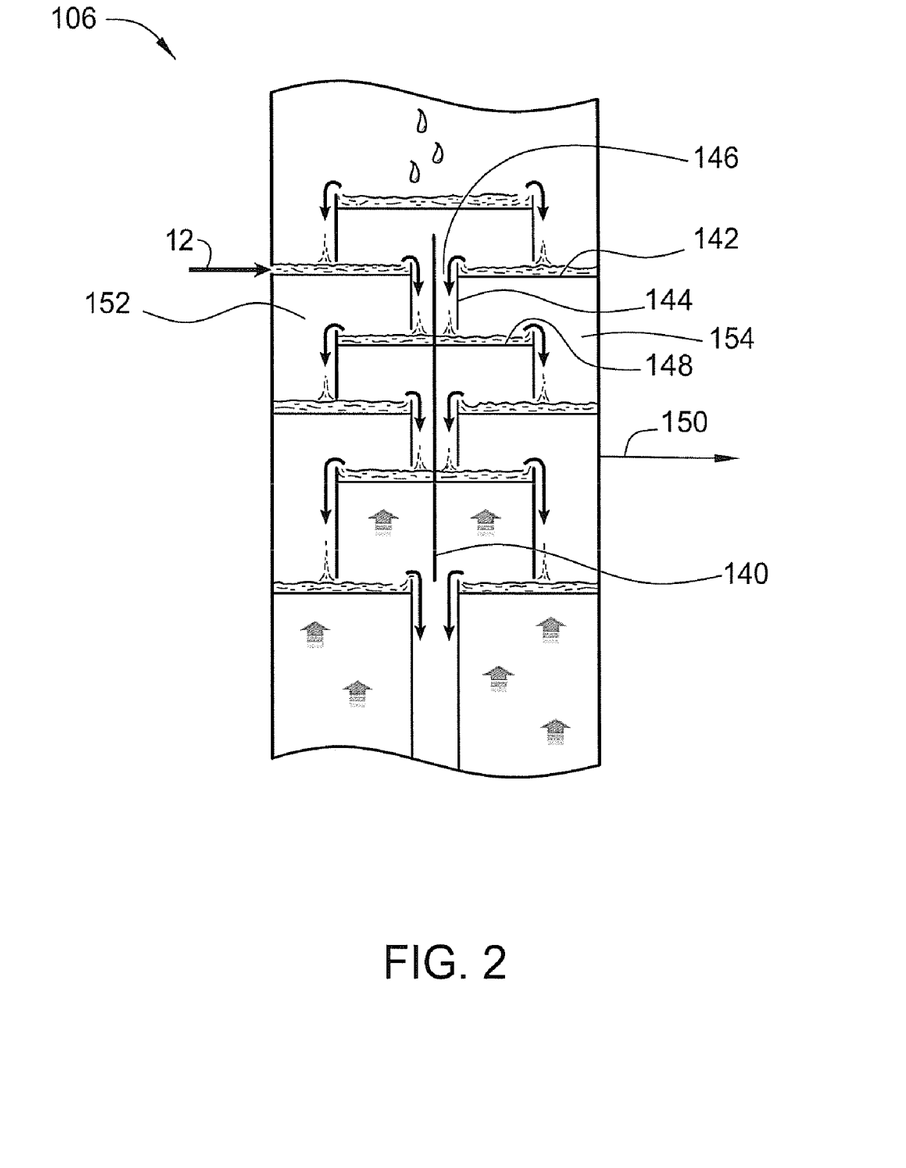
FIG. 2 is a schematic cutaway of the lower distillation section of the distillation tower of FIG. 1 according to one embodiment of the present invention.

FIG. 2 is a schematic cutaway of the lower distillation section of the distillation tower of FIG. 1 according to one embodiment of the present invention. The lower distillation section 106 has been modified with a dividing wall 140 to facilitate separation of the hydrocarbon stream from the liquid acid gas stream. In some embodiments the dividing wall 140 may be replaced by another mechanical separation device, such as a partition, a baffle system, or any other system suitable for separating the hydrocarbon stream from the liquid acid gas stream. The lower distillation section 106 has a substantially or generally vertically disposed, preferably imperforate, dividing wall 140 secured within the interior of the distillation tower 104 in a central region thereof. The dividing wall 140 extends between and is secured to opposite sides of the distillation tower 104. The dividing wall 140 may be attached to the side of the distillation tower 104 by welding or any other means of attachment known in the art.

Figure 3:
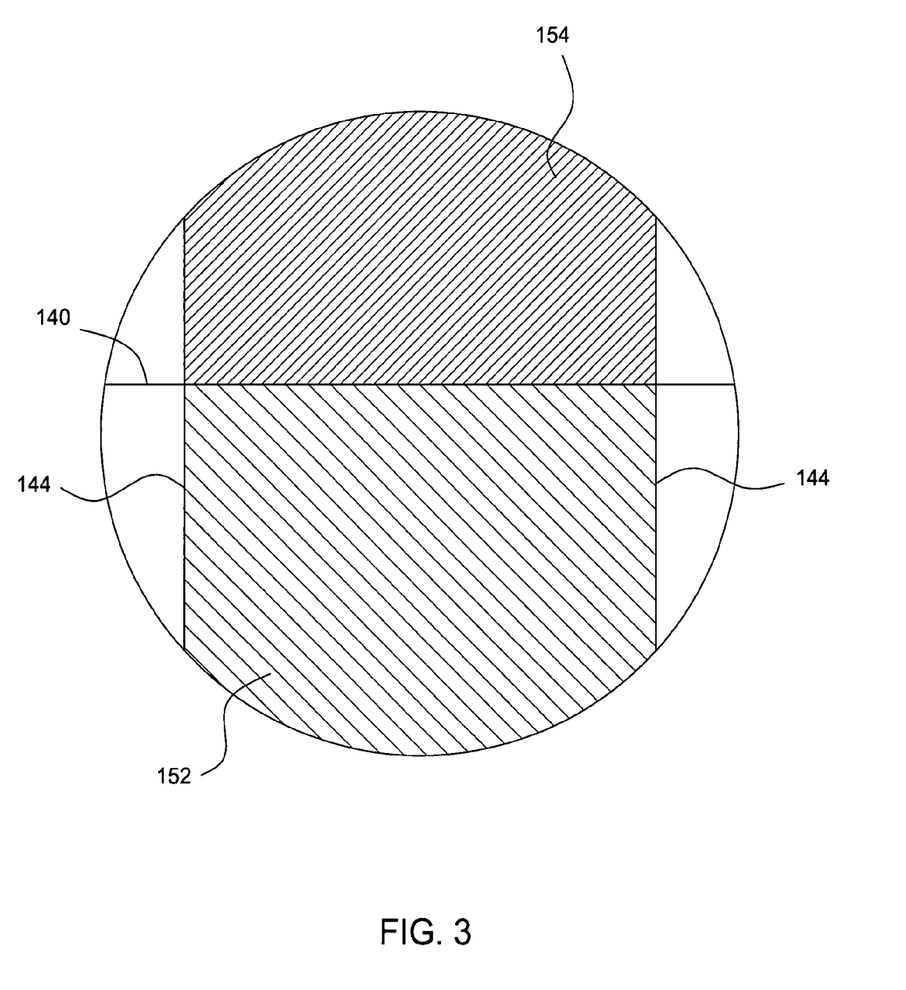
FIG. 3 is a top view of one embodiment of the lower section of the distillation tower of the present invention containing a dividing wall.
Figure 4:
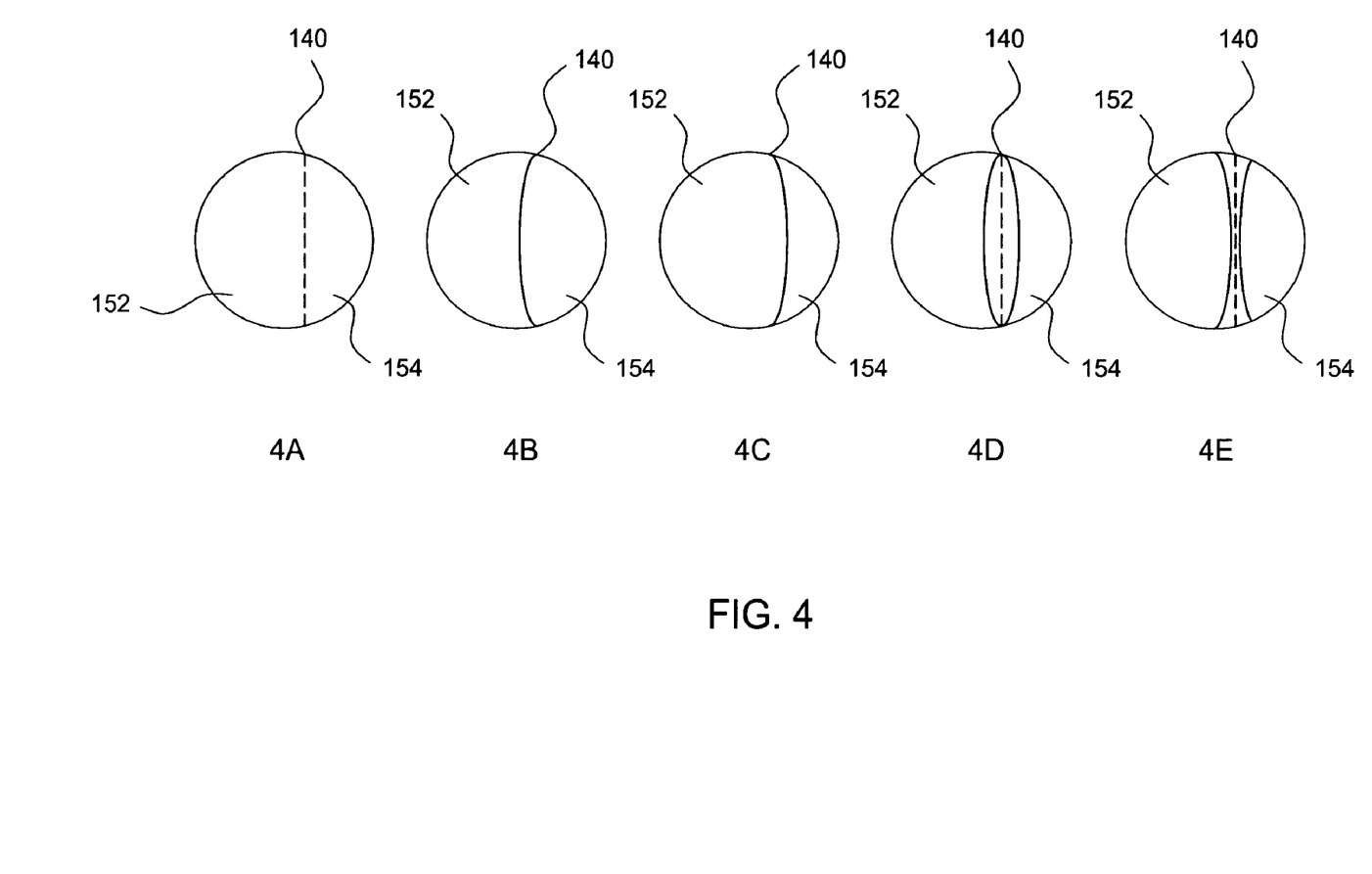
FIGS. 4A-4E are top views of another embodiment of the lower section of the distillation tower containing a dividing wall.

The dividing wall 140 divides the central region of the distillation tower 104 into a pre-fractionation zone 152 and a product zone 154, which is shown in further detail in FIG. 3. A feedstream inlet or tower feed through line 12 opens into the pre-fractionation zone 152 in a central region of the lower distillation section 106. At least three outlets open into the distillation tower 104. The outlets include a bottoms liquid outlet 160 connected with line 28, an overhead vapor outlet opening 162 into the controlled freezing zone 108 and a side draw outlet 164 connected with draw tray 150 opening from the product zone 154 and operable for discharge of fluid from the product zone 154.

The lower distillation section 106 adjacent to the dividing wall 140 is provided with vapor and liquid collecting chamber or zone forming means. In the embodiment shown in FIG. 2 imperforate weir plates 142 are secured within the distillation tower 104 on opposite sides of the dividing wall 140 and are equally spaced therefrom. Downcomer forming plates 144 extend downwardly from the weir plates 142 in spaced apart relation and on opposite sides of the dividing wall 140. The weir plates 142 are generally horizontally disposed, while the downcomer forming plates 144 are generally or substantially vertically disposed. The downcomer forming plates 144 extend upwardly beyond the weir plates 142 and form a dam such that liquid can collect on the weir plates 142. The lower disposed ends of the downcomer forming plates 144 are positioned above a lower adjacent weir plate 148 such that liquid flowing downwardly through the downcomer 146 defined by the downcomer forming plates 144 can flow onto the lower adjacent weir plate 148.

Referring to FIG. 1, in some embodiments, the at least one or more side draw (liquid or) vapor streams facilitated by the dividing wall 140 are sent to further separation devices (such as adsorption or permeable membranes). In one embodiment, the sidestream enriched in hydrocarbons exits the lower distillation zone 106 onto draw tray 150 and then to a separation device 156 where the sidestream enriched in hydrocarbons is further concentrated. In one embodiment, the separation device 156 comprises an adsorption system, such as a pressure swing adsorption system (PSA). Other separation devices can be membrane type filters or combinations of membranes. In the case of adsorption, the separation device 156 may comprise adsorptive materials that are selective for the desired hydrocarbons, for example, silica gel, zeolites, or composites of these materials which concentrate the desired heavier hydrocarbons further, without substantial loss in pressure so that the streams enriched in sour gases can be reintroduced into the product zone 154 of the lower distillation section 106 via line 34. Other selective materials can include clays, charcoal derivatives, aluminas, aluminosilicates, metal-impregnated zeolites, or combinations of these. The materials can be of any structure including nano-particles, structured materials and self-organizing or random packings. Such selective adsorption is greatly facilitated by the lower temperatures of the CFZ process and is a particular advantage of the integration described. These concentrated hydrocarbons exit the separation device 156 via line 36 as an enriched hydrocarbon product stream comprising $C_2^+$ and $C_3^+$. In one embodiment, after exiting the separation device 156, the enriched acid gas liquid bottoms stream is reintroduced into the pre-fractionation zone 152 of the lower distillation column 106. Other embodiments contemplate the reintroduction of the enriched acid gas liquid bottoms stream into any suitable location of the distillation tower 104. In some embodiments, PSA or membrane devices may be used to treat azeotropic compositions that may be encountered in this type of service (e.g., $CO_2$/ethane form an azeotrope).

In one embodiment the adsorptive materials in separation device 156 are cleaned using a purge source. In one embodiment, the purge source is an external stream, such as a $N_2$ stream. In another embodiment, the purge source is an internal stream, for example, $N_2$ produced in the upper distillation section 110. In another embodiment, a thermal pulse may be used to further clean the adsorbents.

FIG. 3 is a top view of one embodiment of the dividing wall 140. In this embodiment, the dividing wall 140 is non-symmetrical. For tower internals design, the dividing wall 140 can be located perpendicular to the downcomer forming plates 144. This orientation allows the two sides of the dividing wall 140 to have equal flow path length and maximize tower efficiency. In addition, the dividing wall 140 can be placed off-center of the tower diameter to balance the tray hydraulics on both sides of the dividing wall 140.

The design is such that the heavier loaded side of the dividing wall 140 has adequate bubble, downcomer, and free areas to avoid any hydraulic limitations. However, if the wall is non-symmetric, the design should also ensure that the hydraulics for the side of the wall with shorter downcomer and weir chord lengths do not provide further limitations, and that there are no significant pinch points that could restrict the flow of vapor and liquid. The tower internals design can be further improved by sectioning the distillation tower based on the internal vapor-liquid traffic in a particular chosen section of the distillation tower.

FIGS. 4A-4E are top views of another embodiments of dividing walls. Although the dividing wall 140 is usually vertical and flat, the dividing wall 140 may also be configured to be substantially convex or concave to the pre-fractionation zone 152 or the product zone 154 to improve pressure balance or to allow the use of a thinner wall. Ensuring adequate sealing of the dividing wall 140 against the inner wall surface of the distillation tower 104 without inducing additional regions of maldistribution is another consideration in the choice of geometries of the dividing wall 140 because sealing affects purity of the hydrocarbons that can be recovered.

In one embodiment, the material of which the dividing wall 140 is constructed comprises a corrosion-resistant metallic material, such as chromium/nickel-containing stainless steel. In another embodiment the material of which the dividing wall 140 is constructed comprises a plastic, for example, polytetrafluoroethylene. In yet another embodiment, the dividing wall 140 comprises a mixture of a metallic material and a plastic material. In yet another embodiment, the dividing wall 140 comprises a hollow tube which may contain a heat-transfer fluid (liquid or vapor etc) and/or absorbent material. Other materials which may be used for the dividing wall 140 include fiberglass, ceramics, and permeable materials. In some embodiments the dividing wall 140 is tapered.

Referring back to FIG. 1, in operation, distillation tower 104 functions as a refluxed demethanizer with a spray zone in the middle to handle the freezing $CO_2$. Under the controlled freezing zone 108 is the melt tray 118, where solid $CO_2$ is converted to a $CO_2$-rich liquid. Above the controlled freezing zone 108 is the rectification section 110, and below the controlled freezing zone 108 is the lower distillation section 106. In one embodiment, a sour gas feedstream 10 comprising $CH_4$, $N_2$, $CO_2$, $H_2S$, $C_2^+$, and $C_3^+$ (which may be partially liquefied) is fed into the lower distillation section 106. In another embodiment, the sour gas feed stream 10 is fed directly into the controlled freezing zone 108. In the controlled freezing zone 108, $CO_2$ vapor is contacted with cold reflux liquid (primarily methane) from spray nozzles 120, which causes the $CO_2$ to freeze out of the gas phase. The liquid methane vaporizes, and rises through the rectification section 110 of the distillation tower 104, where residual $H_2S$ and $CO_2$ are removed from the gas phase. The overhead gas is partially liquefied (through either external refrigeration or by an open-loop process), and the liquid is returned as reflux to the distillation tower 104. Sufficient reflux is generated such that the desired $CO_2$ or $H_2S$ specification is met at the top of the tower. The non-liquefied portion of the overhead gas is thus available for fuel, or sales.

Under the controlled freezing zone 108 is the melt tray 118, where the solid $CO_2$ is converted to a $CO_2$-rich liquid. The rich $CO_2$ liquid is drawn off from the melt tray 118 under liquid level control and reintroduced to the lower distillation section 106. The melt tray 118 is heated from below by vapors from the lower distillation section 106.

The melt tray 118 collects and warms the solid-liquid mixture from the controlled freezing zone 108. (Once the composition is >70% $CO_2$, it reverts to a vapor-liquid system.) The melt tray 118 is designed to provide adequate heat transfer to melt the solid $CO_2$ and to facilitate liquid/slurry drawoff to the lower distillation section 106 of the tower.

In the lower distillation section 106 of the distillation tower 104 below the melt tray 118, residual methane is removed to some required specification, typically to a level of 1% or less in the liquefied acid gas. In an ordinary CFZ column, no further separation is done. However, with the dividing wall 140 and draw tray 150, $C_2$-$C_3$ hydrocarbons may be further separated from the acid gas stream.

In one embodiment, to facilitate the separation of $C_2$-$C_3$ hydrocarbons in the draw tray 150, an intermediate feed in the dividing wall section is utilized. The intermediate feed is provided from line 12; note that there is no passage through the dividing wall 140. The dividing wall 140 is adapted to prevent feed contamination of the sidedraw, thereby enhancing fractionation, with the benefit of two thermally-coupled sections in a single-column shell. In another embodiment, an internal side rectifier is used, in which case an external condenser and reflux may be applied on the product zone 154 of the dividing wall 140 to remove any heavy impurities from the sidestream. In the absence of a feed stream on the feed side of the dividing wall, an "internal" side rectifier may be used. The "internal" side rectifier is an external, side heat exchanger that takes a vapor side draw, condenses the vapors, and provides reflux back to the draw side of the column.

EXAMPLES

The distillation tower configuration was modeled using the commercially-available steady-state process simulation package HYSYS™, and a well-known equation of state. The dividing wall column portion of the CFZ tower is set up as two thermally-coupled columns in series. The height of the dividing wall is represented by a "pre-fractionator" column with the column feed, and is linked to the main CFZ column (which includes a condenser and a reboiler) via recycle streams. The liquid split at the top of the dividing wall from the main column provides reflux to the pre-fractionator, and the vapor split at the bottom of the dividing wall provides boilup.

Optimization variables that were considered include the following: 1) the location and height of the dividing wall (number of stages in pre-fractionator), 2) the flow rate and location of liquid split at the top of the wall, 3) the flow rate and location of vapor split at the bottom of the wall, 4) the number of stripping stages, 5) the feed location, and 6) the reflux rate to the stripping section. The objective of the optimization is to maximize hydrocarbon ($C_2$+) recovery in the sidestream product by adjusting these variables. Alternatively, the optimizer can be set up to minimize the recovery of the acid gas components ($CO_2$, $H_2S$) in the product sidestream, or to minimize column energy requirements, such as reboiler duty.

Operation of a distillation tower was computer simulated in steady state mode using process simulator HYSYS™. The dividing wall column is simulated using two thermally-coupled towers in series, with a pre-fractionator representing the feed side of the dividing wall, and a main column with condenser and reboiler representing the draw side. The vapor from the main column provides boilup to the pre-fractionator, and the liquid provides reflux. The main column for the case referenced herein is modeled with 16 theoretical stages. However, it should be noted that in some embodiments lower distillation zone comprises between eight and twelve theoretical stages. Table 1 below summarizes the exemplary recovery of methane, ethane, acid gas ($CO_2$ and $H_2S$), in the overhead, bottoms, and side product streams, based on the setup shown in FIG. 1.

| Component | Col1Feed kgmol/hr | mol % | Ovhd kgmol/hr | mol % | Reflux kgmol/hr | mol % | Btms (Acid Liq) kgmol/hr | mol % | Prod4 (Sidedraw) kgmol/hr | mol % |
|---|---|---|---|---|---|---|---|---|---|---|
| C1 | 915 | 61.2 | 2317 | 95.6 | 1433 | 95.6 | 4 | 0.9 | 27 | 21.2 |
| C2 | 75 | 5.0 | 0 | 0.0 | 0 | 0.0 | 53 | 12.0 | 22 | 17.3 |
| C3 | 75 | 5.0 | 0 | 0.0 | 0 | 0.0 | 73 | 16.5 | 2 | 1.6 |
| iC4 | 30 | 2.0 | 0 | 0.0 | 0 | 0.0 | 30 | 6.8 | 0 | 0.0 |
| H2S | 226 | 15.1 | 0 | 0.0 | 0 | 0.0 | 203 | 45.9 | 22 | 17.3 |
| CO2 | 134 | 9.0 | 1 | 0.0 | 1 | 0.0 | 79 | 17.9 | 54 | 42.5 |
| N2 | 40 | 2.7 | 106 | 4.4 | 66 | 4.4 | 0 | 0.0 | 0 | 0.0 |
| Total Flow | 1494 | | 2424 | | 1500 | | 442 | | 127 | |

Moreover, the coupling of CFZ and divided wall column (DWC) presents an alternate, single-column alternative to the Ryan-Holmes process. Ryan-Holmes employs two columns in series to effect the separation of methane and some hydrocarbons from the feed gas. A solvent stream (e.g., butane) is used to keep the CO$_2$ in solution, thereby avoiding freeze out of solid CO$_2$ in the column. This solvent is not required in the CFZ-DWC process, because the solid CO$_2$ is formed deliberately in the spray zone, then melted on the melt tray. Eliminating the solvent reduces energy consumption, column size, and the storage of flammable hydrocarbon, which is one consideration in offshore applications.

By recovering most of the methane in the overhead, and at least some of the ethanes-plus in the liquid side product as shown in FIG. 3, the present invention essentially achieves a similar separation as Ryan-Holmes, but with a single column. Hence, for both revamp and grassroots applications, the present invention can afford significant capital and operating expense (i.e. energy) savings over Ryan-Holmes.

Further, in other embodiments, it should be appreciated that the lower distillation zone may include structured or random packing in the dividing wall section instead of or in conjunction with the mass transfer media, such as trays.

While the foregoing is directed to embodiments of the present invention, other and further embodiments of the invention may be devised without departing from the basic scope thereof, and the scope thereof is determined by the claims that follow.

The invention claimed is:

1. A method for the separation of a feedstream in a distillation tower with a controlled freezing zone comprising:
   feeding a mixture of at least one acid gas and methane to a lower distillation zone comprising a dividing wall, which extends substantially vertically through the lower distillation zone to divide the lower distillation zone into a pre-fractionation zone and a product zone;
   producing in the lower distillation zone an enriched acid gas liquid bottoms stream and a freezing zone vapor feedstream at a temperature and pressure at which substantially no carbon dioxide solids are formed;
   contacting in the controlled freezing zone the freezing zone vapor feedstream with at least one freezing zone liquid feedstream containing methane at a temperature and pressure wherein both solids containing carbon dioxide and a methane-enriched vapor stream are formed;
   removing in an upper distillation section an acid gas component from the methane-enriched vapor stream;
   separating the enriched acid gas liquid bottoms stream into a liquid acid gas stream and a hydrocarbon stream;
   recovering from a draw tray of the lower distillation zone a portion of the hydrocarbon stream and concentrating the portion of the hydrocarbon stream using an adsorption or membrane system to produce an enriched hydrocarbon product stream and an enriched sour gas stream; and
   reintroducing the enriched sour gas stream into the lower distillation section.

2. The method of claim 1, wherein separating the enriched acid gas liquid bottoms stream comprises distilling the enriched acid gas liquid bottoms stream.

3. The method of claim 1, wherein the at least one acid gas comprises a mixture of hydrogen sulfide and carbon dioxide.

4. The method of claim 1, wherein the enriched sour gas stream is reintroduced into a prefractionation zone of the lower distillation column.

5. The method of claim 1, wherein the enriched hydrocarbon product stream is further concentrated using a pressure swing adsorption system.

6. A method for the separation of a sour gas feedstream containing methane and carbon dioxide acid gas in a distillation tower comprising:
   maintaining a lower distillation zone comprising a dividing wall, which extends substantially vertically through the lower distillation zone to divide the lower distillation zone into a pre-fractionation zone and a product zone, said lower distillation zone configured to produce an enriched carbon dioxide liquid bottoms stream and a freezing zone vapor feed stream;
   maintaining a controlled freezing zone configured to contact the freezing zone vapor feedstream with at least one freezing zone liquid feedstream containing methane at a temperature and pressure whereby both solids-containing carbon dioxide and a methane-enriched vapor stream are formed in the controlled freezing zone;
   introducing the sour gas feedstream containing methane and carbon dioxide gas into the lower distillation zone;
   producing the enriched carbon dioxide liquid bottoms stream and the freezing zone vapor feedstream;
   introducing the freezing zone vapor feedstream into the controlled freezing zone;
   contacting in the controlled freezing zone the freezing zone vapor feedstream with the at least one freezing zone liquid feedstream;
   forming in the controlled freezing zone the solids containing carbon dioxide and the methane-enriched vapor stream;
   melting the solids containing carbon dioxide and introducing a liquid stream containing the melted solids into the lower distillation zone;
   separating the liquid stream containing the melted solids into a liquid acid gas stream and a hydrocarbon stream;
   recovering from a draw tray of the lower distillation zone a portion of the hydrocarbon stream and concentrating the portion of the hydrocarbon stream using an adsorption or membrane system to produce an enriched hydrocarbon product stream and an enriched sour gas stream; and
   reintroducing the enriched sour gas stream into the lower distillation section.

7. The method of claim 6, further comprising:
   condensing at least a portion of the methane-enriched vapor stream and forming the at least one freezing zone liquid feedstream with at least a portion of the condensed vapor stream; and
   recovering at least a portion of the remainder of the methane-enriched vapor stream as a methane-enriched product stream.

8. The method of claim 6, wherein the lower distillation zone comprises a dividing wall column configured to separate the feedstream containing methane and carbon dioxide into a low boiler fraction, an intermediate boiler fraction, and a high boiler fraction.

9. The method of claim 8, wherein the intermediate boiler fraction comprises the hydrocarbon stream.

10. The method of claim 8, wherein the higher boiler fraction comprises the liquid acid gas stream.

11. The method of claim 8, wherein the low boiler fraction comprises methane.

12. The method of claim 6, further comprising:
   maintaining an upper distillation zone configured to produce the at least one freezing zone liquid feedstream and an overhead vapor stream and operated at a temperature and a pressure at which substantially no carbon dioxide solids are produced within the upper distillation zone;
   condensing at least a portion of the overhead vapor stream and recycling at least a portion of the condensed overhead vapor stream as reflux in the upper distillation zone; and
   recovering at least a portion of the remainder of the overhead vapor stream as a methane-enriched product stream.

13. A distillation tower for the separation of a feedstream containing methane and carbon dioxide acid gas comprising:
a lower distillation zone comprising:
- a dividing wall, which extends substantially vertically through the lower distillation zone to divide the lower distillation zone into a pre-fractionation zone and a product zone, both of the zones opening at both ends of the dividing wall in common zones above and below the dividing wall, wherein an enriched carbon dioxide liquid bottoms stream and a freezing zone vapor feedstream are produced at a temperature and pressure at which substantially no carbon dioxide solids are formed;
- a side draw tray outlet configured to receive a hydrocarbon stream separated from the enriched carbon dioxide liquid bottoms stream; and
- an adsorption or membrane device in fluid communication with the side draw outlet, wherein the adsorption or membrane device is configured to separate the hydrocarbon stream into an enriched hydrocarbon product stream and an enriched sour gas stream;
- a reintroduction inlet in fluid communication with the absorption or membrane device to reintroduce the enriched sour gas stream into the lower distillation section;

an inlet to the lower zone of the distillation tower for a feedstream containing methane and carbon dioxide acid gas;

a controlled freezing zone wherein a freezing zone liquid feedstream containing methane is contacted with the freezing zone vapor feedstream at a temperature and pressure wherein both solids containing carbon dioxide and a methane-enriched vapor stream are formed; and an upper distillation section wherein an acid gas component from the methane-enriched vapor stream is removed.

14. The distillation tower of claim 13, wherein the dividing wall comprises a corrosion-resistant material.

15. The distillation tower of claim 14, wherein the corrosion resistant-material is polytetrafluoroethylene.

16. The distillation tower of claim 13, wherein the dividing wall comprises a corrosion-resistant metallic material.

17. The distillation tower of claim 16, wherein the corrosion-resistant metallic material comprises a chromium-nickel containing stainless steel.

18. The distillation tower of claim 13, wherein the lower distillation zone comprises between eight and twelve theoretical stages.

19. The distillation tower of claim 13, wherein the lower distillation zone comprises at least two thermally-coupled sections.

20. The distillation tower of claim 13, wherein the dividing wall is convex relative to the pre-fractionation zone.

21. The distillation tower of claim 13, wherein the dividing wall is concave relative to the pre-fractionation zone.

22. The distillation tower of claim 13, wherein the adsorption or membrane device comprises adsorptive materials selective for the enriched hydrocarbon product stream.

23. The distillation tower of claim 22, wherein the adsorptive materials are selected from the group consisting of silica gels, zeolites, or composites thereof.

24. The distillation tower of claim 13, wherein the adsorption or membrane device comprises a permeable membrane selective for the hydrocarbon product stream.

* * * * *